United States Patent [19]

Butler et al.

[11] 4,007,547
[45] Feb. 15, 1977

[54] CARD HANDLING TEACHING MACHINE WITH INSTANTANEOUS FEEDBACK SYSTEM

[75] Inventors: Glenn A. Butler, Hanover Park; George McKinley, Northbrook, both of Ill.

[73] Assignee: Bell & Howell Company, Chicago, Ill.

[22] Filed: Jan. 9, 1975

[21] Appl. No.: 539,773

[52] U.S. Cl. .................... 35/35 C; 360/2; 360/60

[51] Int. Cl.² .................... G09B 19/04

[58] Field of Search ........... 35/5, 8 A, 9 A, 9 C, 35/9 R, 35 C, 48 R; 179/1 SW, 1 C, 2 C, 1 MN; 360/2, 31, 60–62

[56] References Cited

UNITED STATES PATENTS

| | | | |
|---|---|---|---|
| 2,627,555 | 2/1953 | Luberoff | 179/100.11 |
| 3,059,347 | 10/1962 | Warner et al. | 35/35 C |
| 3,073,041 | 1/1963 | Haban | 35/35 C |
| 3,358,390 | 12/1967 | Korn | 35/35 C |
| 3,488,867 | 1/1970 | Lyon et al. | 35/35 C |
| 3,610,635 | 10/1971 | Schiff et al. | 35/35 C X |
| 3,678,212 | 7/1972 | Wild | 360/2 X |
| 3,752,938 | 8/1973 | Ozawa | 360/60 |

*Primary Examiner*—Anton O. Oechsle
*Assistant Examiner*—Vance Y. Hum
*Attorney, Agent, or Firm*—John R. Hoffman; Robert J. Schneider; Roger M. Fitz-Gerald

[57] ABSTRACT

An improvement is provided in an audio visual teaching device which is particularly suitable for teaching the proper and correct pronunciation of words, phrases, etc. The device employs a card handling mechanism for moving an information card across a record/playback transducing head. A dual track magnetic stripe on the card carries information on one track indicating the correct pronunciation of a particular word or group of words which the student can hear through a speaker or preferably a set of headphones. Additionally, the device includes a microphone and record portion so that the student can practice speaking a word which then is simultaneously recorded on a second track on the magnetic stripe so that the student may replay the second track and listen to his own pronunciation and compare it to the model on the first track. The improvement comprises an instantaneous feedback system to the headphones so that the students may simultaneously hear through the headphones an audible signal that is being recorded on the information card when pronouncing a word. The instantaneous feedback system permits objective and simultaneous hearing of the student's own words.

11 Claims, 2 Drawing Figures

U.S. Patent        Feb. 15, 1977        4,007,547
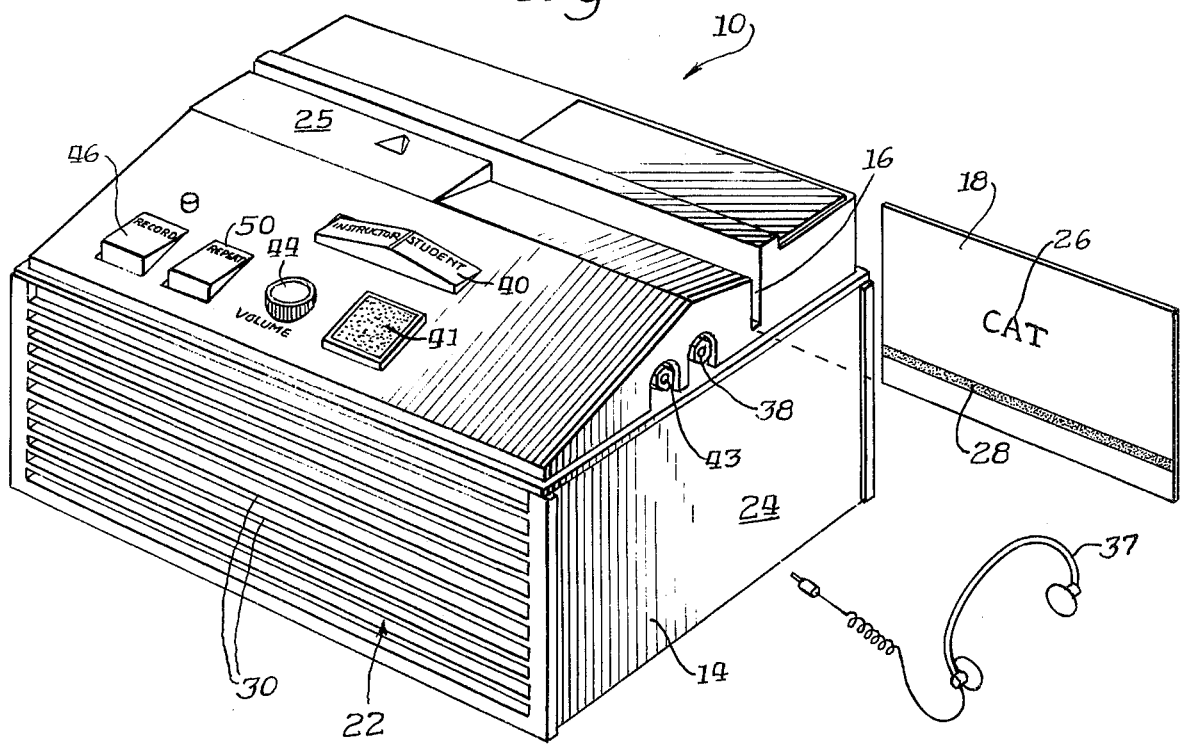
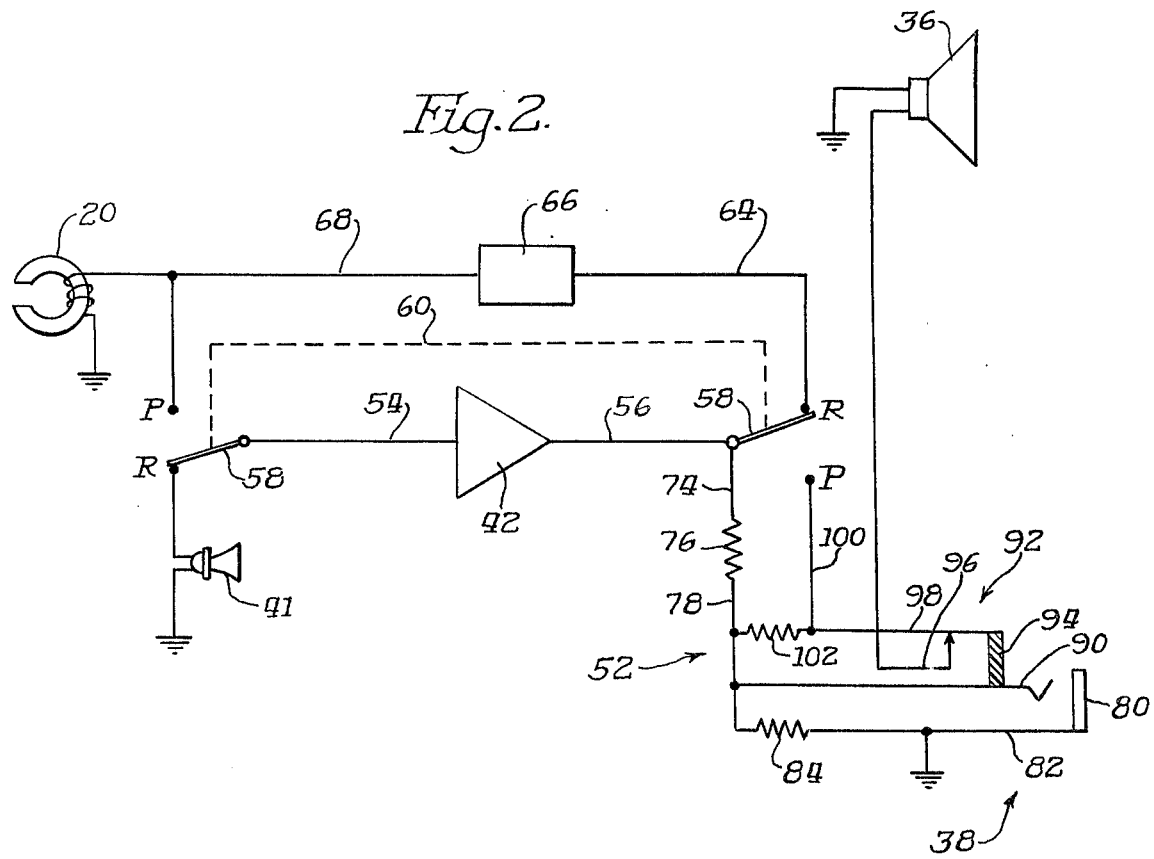

CARD HANDLING TEACHING MACHINE WITH INSTANTANEOUS FEEDBACK SYSTEM

BACKGROUND OF THE INVENTION

The present invention relates generally to audio visual teaching devices and more particularly to an improved teaching device of the type shown and described in U.S. Pat. No. 3,869,718 to Josef Schmidt, filed June 6, 1973 and assigned to the assignee of the present invention, which application disclosure is incorporated by reference in this application but includes the instantaneous feedback system herein described.

Teaching machines employing a drive system for moving an information card including a magnetic stripe through a guide channel past a transducing head are well known in the art. Generally, such machines transport the card past a transducing/recording head which reads a sound track containing a magnetic recording of selected "model" audio information. The simultaneous stimulation of different physical senses has been recognized by educators as an efficient method for the teaching of foreign languages, for example. Therefore, corresponding information in the form of a picture or the like usually is printed on the card to stimulate the student visually at substantially the same time as the student is being stimulated audibly.

Prior art machines also have permitted the student to record his own voice on a second track of the magnetic stripe so that he may replay his pronunciation and compare it to the model. As noted above, this type of teaching machine is particularly applicable to the teaching of a foreign language where continued practice is needed for the correct pronunciation of a foreign vocabulary. The teaching of known words or phrases to young or retarded students also is an important use of such machines. Also, since many students usually are in one room or "learning laboratory", it is necessary and desirable to use headphones in order to permit simultaneous operation of several teaching machines by a large number of students.

It is known that, when speaking normally, one hears his own voice in a different manner than one hears other people in normal conversation. This is due to the fact that one hears his own voice simultaneously by two acoustic channels. One channel is an external, aerial route between the mouth and ears. The second channel is by internal, bone conduction, between the vocal and auditive organs. This phenomenon is confirmed in every day life by the well known fact that any one who hears his own voice from a tape recording finds it unrecognizable in comparison with the sounds he is accustomed to hearing when listening to himself speak normally. This distortion of tonality is a major cause of difficulties experienced in acquiring good pronunication of a foreign vocabulary, for instance. Particularly, when a set of headphones is being used by the student during a particular learning session, the sound vibrations which travel through the air are substantially muffled by the headset and therefore the student can hear the word he is pronouncing only through the second or bone conduction route. Therefore the word appears to be very distorted since we are accustomed to hearing what we are saying through both acoustic channels.

SUMMARY OF THE INVENTION

Accordingly, the primary object of this invention is to provide a card readout audio visual teaching machine which includes an instantaneous feedback system which transmits the signal which is being recorded simultaneously to the headphones so that the student hears an undistorted or "natural" sound reproduction of his voice.

In accordance with the present invention, an audio visual teaching device as shown in the aforesaid U.S. Pat. No. 3,869,718 is provided and improved particularly for headset use to eliminate distorted sound reproduction. The improvement comprises an instantaneous feedback means for permitting a student to simultaneously listen to what he is saying through a headphone set as a magnetic signal is recording the message on an information card to provide a more natural and undistorted reproduction of the message for the student.

Other objects, features and advantages of the invention will be apparent from the following detailed description taken in connection with the accompanying drawings.

BRIEF DESCRIPTION OF THE DRAWINGS

FIG. 1 is a perspective view of an audio visual teaching machine embodying the concepts of the present invention; and FIG. 2 is a schematic representation of the electrical components of the instantaneous feedback system of the present invention.

DESCRIPTION OF THE PREFERRED EMBODIMENT

Looking to FIG. 1, an audio visual teaching machine, generally designated 10, is provided including a cabinet 14 having a longitudinal slot 16 in the top thereof for receiving and longitudinally transporting an information card 18 past a transducing head 20 (FIG. 2) mounted within the slot 16. The mechanical details of the card readout and transport mechanism are shown and described in the aforesaid U.S. Pat. No. 3,869,718, which hereby is incorporated by reference herein and thus need not be explained in detail herein. In addition, a "repeat" card return mechanism is utilized as shown in U.S. Pat. No. 3,821,519 to Pietenpol, also assigned to the assignee of the present invention.

The cabinet 14 includes a front wall 22, side walls 24 and a top wall 25. The information card 18 carries a visual image 26 corresponding or relating to a model vocabulary word or group of words which is carried on one track of a dual track magnetic stripe 28 on the card. The front wall 22 of the cabinet includes a plurality of louvers 30 behind which is mounted a speaker cone 36 (FIG. 2) for audibly reproducing the message carried on the magnetic stripe 28. Alternatively, a pair of headphones 37 may be used, for example, in a teaching laboratory where a large number of students may be using several teaching machines accompanied by a single teacher in a "learning laboratory". A headphone jack, generally designated 38, is provided in the right side wall 24 of the cabinet and in conventional manner mechanically disconnects the speaker 36 when the headphone plug is inserted in the jack 38.

The teaching device includes a plurality of controls which are mounted on the top wall 25 of the cabinet. As shown in the aforementioned patent, the controls include a mode switch 40 which mechanically moves the transducing head permitting the student to listen to the model pronunciation of the word carried on the magnetic stripe 28 or, in another position, to hear his own pronunciation of the word which has been recorded on a second track on the magnetic stripe 28. A condensor type microphone 41 is provided on top of the cabinet for relaying a spoken word to an audio amplifier 42 (FIG. 2) for recording. Alternatively, an external microphone can be connected through a mike jack 43 provided on the right side 24 of the cabinet adjacent the headphone jack. A volume control knob 44 is provided to adjust the amplitude of the speaker or headphone output. To the left of the volume control knob, as seen in FIG. 1, is a record button 46 which permits the student to record what he is saying on the magnetic stripe 28. Adjacent the record button 46 is a repeat button 50 which moves the information card 18 backwards so that either of the messages recorded on the stripe 28 may be quickly replayed.

As mentioned previously, when a student is using a set of headphones 37, it is desirable that the student hear what he is saying simultaneously through the headphone set so that he may have a "normal" or undistorted perception of what he is saying. This perception includes sound transmissions through the aerial route as well as the bone conduction route. However, the signal which is being recorded on the magnetic stripe 28 is derived exclusively through the aerial route. In this manner, the student can compare his recorded message with the model pronunciation.

Referring now to FIG. 2, an instantaneous feedback system, generally designated 52, is provided in order to achieve this desirable result. More particularly, the amplifier 42 includes an input line 54 and an output line 56 which are connected to a multipole switch 58. Although the switch 58 contains a plurality of poles, only two sets thereof are represented in FIG. 2 since these are the only two sets of contacts necessary for a complete description of the present invention. The two portions or sets of contacts of the switch 58 are shown at opposite ends of the amplifier 42 and are connected by a mechanical linkage represented by the dotted line 60. The switch 58 is operable in two positions, the record position as shown in FIG. 2, and represented by the letter R, and a play position when the opposite contact is made, which is represented by the letter P.

In the record position (shown in FIG. 2), the switch 58 connects the microphone 41 with the input line 54 of the amplifier 42. The output 56 of the amplifier is transferred by the switch 58 to line 64 which is connected to a filter 66. The filter 66 is a high pass filter which is then connected by a line 68 to the transducing head 20 which, in this case, is used for recording the signal on the magnetic stripe 28 on the information card 18. Simultaneously, the output line 56 is connected by a line 74 to a 2.2 K-ohm resistor 76. The resistor 76 is connected by a line 78 to the headphone jack 38. The resistor 76 serves to attenuate the amplifier output signal so that it is not necessary to adjust the volume control knob 44 when using the headphone set 37. The resistor 76, however, provides a flat, non-frequency responsive attenuation path to the headphone jack 38 to lower signal amplitude for convenience. The headphone jack 38 includes one contact 80 which is connected to ground by a line 82 and to a 100 ohm resistor 84 to the input line 78. The resistor 84, in conjunction with a third resistor in the speaker line, to be described below, serves to further reduce the playback level at the headphone output and isolate the instantaneous feedback signal from the speaker 36.

The headphone jack 38 also includes a movable contact 90 which carries the signal from the input line 78 to the headphones 37. The contact 90 is slightly flexible and connected to a speaker switch means, generally designated 92, by a nonconductive element 94. The speaker switch means 92 includes a nonmovable contact 96 which is connected directly to the speaker 36. A flexible contact 98 engages the contact 96 when the headphone plug is not inserted in the jack 38. The flexible contact 98 is connected to the P contact of the switch 58 by a line 100 and to the amplifier output line 78 by a 1 K-ohm resistor 102. This 1 K-ohm resistor 102 serves to isolate the instantaneous feedback signal from the speaker 36.

When the headphones 37 are being used and the teaching device 10 is in the record mode, the amplifier output 56 is transferred by the transducing head 20 to the magnetic stripe 28 on the card 18 while simultaneously producing an audio signal through the headphones 37 to the student. Therefore, when recording a pronunciation of a word, the student hears what he is saying partially by bone conduction and through the electronic route which is equivalent to the aerial route so that he hears the word as he would normally hear it when not using the teaching machine. The message which is recorded on the magnetic stripe 28 is that portion which corresponds to the signal being produced by the headphone set 37. When the headphones 37 are not in use, the speaker 26 is connected to the amplifier output and the resistors 76 and 102 attenuate the instantaneous feedback signal to a level which is inaudible through the speaker 36. This is desirable since, when the headphones 37 are not being used, the student can hear what he is saying into the microphone 41 through the normal aerial route.

When the teaching device 10 is used in the playback mode, the amplifier output 56 is carried directly to the speaker 36 if the headphone jack is removed, and therefore the recorded message is heard directly through the speaker 26. Conversely, when the headphone plug is inserted into the headphone jack 38, the speaker 26 is disconnected and the recorded signal can be heard through the headphones 37. Therefore, the amplifier output signal can always be heard through the headphones 37 whether in the record or playback mode. However, the speaker can only produce an audible signal when the audio visual device 10 is used in the playback mode. This is especially desirable, as mentioned above, since, if a student is not using the headphone set 37, it is possible for him to hear his voice in the normal manner through the aerial route. However, when using the headphones 37, a student cannot hear his voice through the aerial route because of the headphone set 37 and it is required to reproduce the audio signal within the headphone set for hearing that portion which normally travels through the aerial route. Thus the device 10 allows a student who is using a headphone set to hear himself speak in the normal manner as if the headphone set 37 was not being used.

The foregoing detailed description has been given for clearness of understanding only and no unnecessary limitations should be understood therefrom as some modifications will be obvious to those skilled in the art.

We claim:

1. An improvement in a card reading type teaching machine adapted to read an information card having a magnetic stripe for providing normal hearing of one's own voice, comprising, in combination:
- a transducing means for recording information on the card and reproducing information from the card;
- card transport means for moving the card from a first position past the transducing means to a second position and returning the card to the first position;
- a microphone for receiving a person's spoken sounds and producing a microphone output signal;
- a sound output means for producing an audible signal;
- an amplifier;
- switch means movable between a record mode and a playback mode for alternately connecting said amplifier to said microphone and transducing means when in a record mode, for recording the microphone output signal on the magnetic stripe and for connecting the transducing means and amplifier with the sound output means when in the playback mode for audibly reproducing a recorded signal from the magnetic stripe; and
- an instantaneous feedback means connecting said amplifier with said sound output means by a non-frequency responsive attenuated path whereby the information being recorded is simultaneously transmitted to the sound output means to permit the user to simultaneously hear an undistorted reproduction.

2. The teaching machine of claim 1 including at least two recording tracks, a first track for carrying a model message and a second track on the information card for recording the information from the sound input means.

3. The teaching machine of claim 2 including control means for selectively audibly reproducing information from either of said recording tracks on the information card.

4. The teaching machine of claim 1 wherein the sound output means comprises a headphone set which fits snugly against the head of the user to substantially eliminate environmental noise.

5. The teaching machine of claim 4 including at least two recording tracks, a first track for carrying a model message and a second track on the information card for recording the information from the sound input means.

6. The teaching machine of claim 5 including control means for selectively audibly reproducing information from either of said recording tracks on the information card.

7. The teaching machine of claim 1 wherein the sound output means includes an audio speaker, a set of headphones and a headphone jack switch, said speaker and headphones being alternately connected by said jack switch to said amplifier.

8. The teaching machine of claim 7 wherein the instantaneous feedback means includes means defining a second attenuated path in the record mode to decrease the signal to the speaker to an inaudible level.

9. An instantaneous feedback system for an instructional card reader adapted for an informaton card having a first and second recording track thereon comprising, in combination:
- transducing means for recording and reproducing an instructional model message on said first recording track and for recording and reproducing a student's oral signal onto said second recording track;
- an amplifier means including switch means connected to said transducing means for reproducing said first track and said second track selectively with either a headphone or a loudspeaker so as to permit the student to hear said instructional message or the student's signal;
- a microphone connected to said amplifier for receiving the student's signal and providing a microphone output signal to the amplifier for recording by the transducing means on the second track; and
- an instantaneous feedback means connecting said amplifier means to said headphone or loudspeaker through a non-frequency responsive attenuated path whereby the information being recorded on the second track is simultaneously transmitted to the headphone or loudspeaker to permit the user to hear an undistorted reproduction of his signal.

10. The instantaneous feedback system of claim 11 wherein said switch means comprises a headphone jack for selectively and alternatively connecting said headphones or loudspeaker with said amplifier.

11. The instantaneous feedback system of claim 10 wherein the instantaneous feedback means connecting said loudspeaker to said amplifier includes a second attenuating means for reducing the signal to the loudspeaker to an inaudible level during recording.

* * * * *

UNITED STATES PATENT OFFICE
CERTIFICATE OF CORRECTION

PATENT NO. : 4,007,547
DATED : February 15, 1977
INVENTOR(S) : Glenn A. Butler and George McKinley It is certified that error appears in the above-identified patent and that said Letters Patent are hereby corrected as shown below:

IN THE CLAIMS:

In claim 10, line 1, after "claim" delete "11" and insert --9--.

Signed and Sealed this

Seventh Day of June 1977

[SEAL]

Attest:

RUTH C. MASON
Attesting Officer

C. MARSHALL DANN
Commissioner of Patents and Trademarks